United States Patent [19]
Siebenga

[11] Patent Number: 4,619,570
[45] Date of Patent: Oct. 28, 1986

[54] BALE LOADING-STACKING APPARATUS

[76] Inventor: Charles Siebenga, 76911 Gallatin Rd., Bozeman, Mont. 59715

[21] Appl. No.: 598,925

[22] Filed: Apr. 10, 1984

Related U.S. Application Data

[63] Continuation of Ser. No. 363,645, Mar. 30, 1982, abandoned.

[51] Int. Cl.³ .......................... A01D 87/12; B60P 1/44
[52] U.S. Cl. ........................................ 414/39; 414/44; 414/469; 414/554; 414/786
[58] Field of Search .................. 414/38, 39, 40, 44, 414/111, 469, 472, 473, 546, 551, 553, 554, 557, 786, 785, 721

[56] References Cited

U.S. PATENT DOCUMENTS

| | | | |
|---|---|---|---|
| 3,477,600 | 11/1969 | Sawyer | 414/785 |
| 3,572,521 | 3/1971 | Grey et al. | 414/39 |
| 3,967,742 | 7/1976 | Meinert | 414/721 X |
| 4,008,818 | 2/1977 | Neely | 414/39 X |
| 4,050,598 | 9/1977 | Schurz | 414/551 X |

FOREIGN PATENT DOCUMENTS

| | | | |
|---|---|---|---|
| 2630184 | 2/1977 | Fed. Rep. of Germany | 414/38 |
| 1214653 | 11/1959 | France | 414/472 |
| 2035916 | 6/1980 | United Kingdom | 414/111 |

OTHER PUBLICATIONS

"Upsy Daisy" Hydraulic Lift Brochure.

*Primary Examiner*—Leslie J. Paperner
*Attorney, Agent, or Firm*—John A. Waters

[57] ABSTRACT

A bale loading-stacking apparatus is provided for mounting on the bed or frame of a truck, trailer or the like to collect and load bales, such as bales of hay, and to deposit the collected bales at an accumulation location. The apparatus includes an accumulator platform pivotally mounted to the bed or frame of the truck, trailer, or the like to permit the platform to be pivoted between a horizontal position for loading the bales to a vertical position for depositing a stack of bales. A bale loading apparatus is mounted at the rear of the platform which includes a loading ramp pivotally mounted so as to be pivotable between a generally horizontal position at ground level extending rearwardly of the platform and a generally vertical position extending above the rear end of the platform. Power means are provided for pivoting the platform and for pivoting the loading ramp. Preferably, at least two retriever arms are pivotally mounted on opposite sides of the platform, with the arms being pivotable inwardly to grip bales on the platform and outwardly to a non-gripping position.

8 Claims, 10 Drawing Figures

BALE LOADING-STACKING APPARATUS

CROSS REFERENCE TO RELATED APPLICATION

This is a continuation of application Ser. No. 363,645, filed Mar. 30, 1982, now abandoned.

BACKGROUND OF THE INVENTION

1. Field of the Invention

The present invention relates to a loading-stacking apparatus, and, more particularly, to a loading-stacking apparatus for loading bales, such as bales of hay, onto a truck, a trailer or the like and for subsequently unloading stacks of bales.

2. Description of the Prior Art

In harvesting crops such as hay, the current practice is to utilize mobile baling devices which collect the hay and form it into bales. The bales of hay are discharged to the ground as they are formed. Wagons or trucks are then driven over the field, and the individual bales are loaded thereon for transportation to a place of storage or the like.

While some bale wagons are still loaded and unloaded by hand, generally a lifting apparatus, such as a forklift truck, is utilized to lift the bales and to load them on the bale truck or wagon. When the bale wagon is completely loaded, the bale wagon and the forklift truck are driven to the desired place of storage. The forklift truck is then utilized to unload the bales and to stack them in the desired location. In cases the entire load is dumped and then the bales must be stacked. Not only do these methods require multiple workers and piecemeal unloading, they are inefficient and time consuming. In addition, a certain degree of skill is required on the part of the forklift driver to avoid bales falling from the bale wagon or entire bale stacks toppling if not stacked properly.

While a variety of complex accessory apparatus has been designed for loading bale wagons, such as conveyor apparatus and the like, none has been entirely satisfactory. In many cases, the loading apparatus is separate from the bale wagon and must be transported from bale to bale along with relocating the bale wagon. Much of this equipment is not only complex and expensive, it is single purpose and simply consumes storage space throughout most of the year.

Accordingly, there is a present need for a simple, inexpensive and efficient apparatus for loading and stacking bales, such as bales of hay. Desirably, such apparatus would be integrated with the bale truck or wagon and would not obstruct year-round use of such truck or wagon.

SUMMARY OF THE INVENTION

According to the present invention, there is provided a bale loading-stacking apparatus which is mounted on a bale truck, trailer or the like. The apparatus includes a bale accumulator platform having a front end and rear end, including means for pivotally mounting the platform on the bed or frame of the truck, trailer or the like to permit the platform to be provided between a horizontal position and a vertical position. The pivot mounting location is at the rear end of the bed or frame and at a distance forward of the platform rear end approximately equal to the height of the bed or the frame above the ground. Power means, preferably one or more hydraulic cylinders, are utilized to pivot the platform between a horizontal position and a vertical position.

A bale loading apparatus is mounted at the rear of the platform and includes a rigid frame member mounted to the platform and depending below the rear end thereof. A loading ramp, preferably a pair of fork members, is mounted to the rigid frame member so as to be pivotable between a generally horizontal position at ground level extending rearwardly of the platform and a generally vertical position extending above the rear end of the platform. The ramp includes bale stop means on the top surface thereof located at a distance from the pivot mounting location on the rigid frame member so as to be approximately level with the top of the platform when the ramp is in the generally vertical position. Preferably, the loading ramp is pivotally mounted to a linkage member which is pivotally mounted to the rigid frame member. Also preferably, adjustment means are provided on the ramp member to pivot the ramp member to vary the plane thereof with respect to the plane of the linkage member.

Power means are provided for pivoting the loading ramp between generally horizontal and vertical positions. Preferably, the power means includes a pair of hydraulic cylinders, one end of each cylinder being pivotally mounted to the platform and the other end of each cylinder being pivotally mounted to the linkage member.

Finally, at least two retriever arms are preferably provided and are pivotally mounted on opposite sides of the platform intermediate the front end and the rear end thereof and extending above the platform. Power means, such as a hydraulic cylinder, are utilized to pivot the retriever arms inwardly to grip bales on the platform and outwardly to a non-gripping position.

DESCRIPTION OF THE PREFERRED EMBODIMENTS

Figure 1:
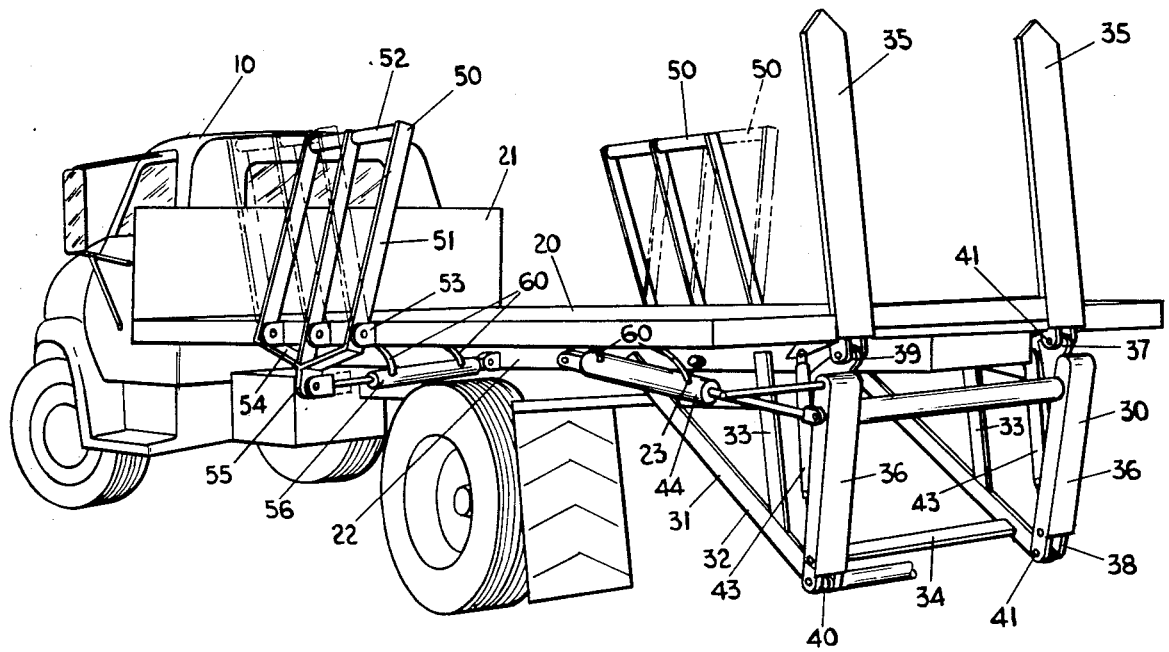
FIG. 1 is a rear perspective view of the bale loading-stacking apparatus of the present invention mounted on the bed of a truck.

Referring to the drawings in greater detail, the apparatus of the present invention is shown mounted on the bed of a truck. As shown in the rear perspective view of FIG. 1, bale platform 20 is shown pivotally mounted on frame or bed (FIGS. 6, 7, and 10) of truck 10. Bale loading apparatus 30 is mounted at the rear of platform 20, and a pair of retriever arms 50 are pivotally mounted on the sides of the platform 20.

Bale platform 20 is rectangular and flat with an upwardly extending front wall 21 to prevent bales from being pushed off of the front end of platform 20 against the rear of the cab of truck 10. On the under surface of platform 20 is a pair of depending side wall members 22 to which are mounted various components of the apparatus of the present invention and which extend around the sides of truck frame 11 when platform 20 is in the horizontal position.

Figure 7:
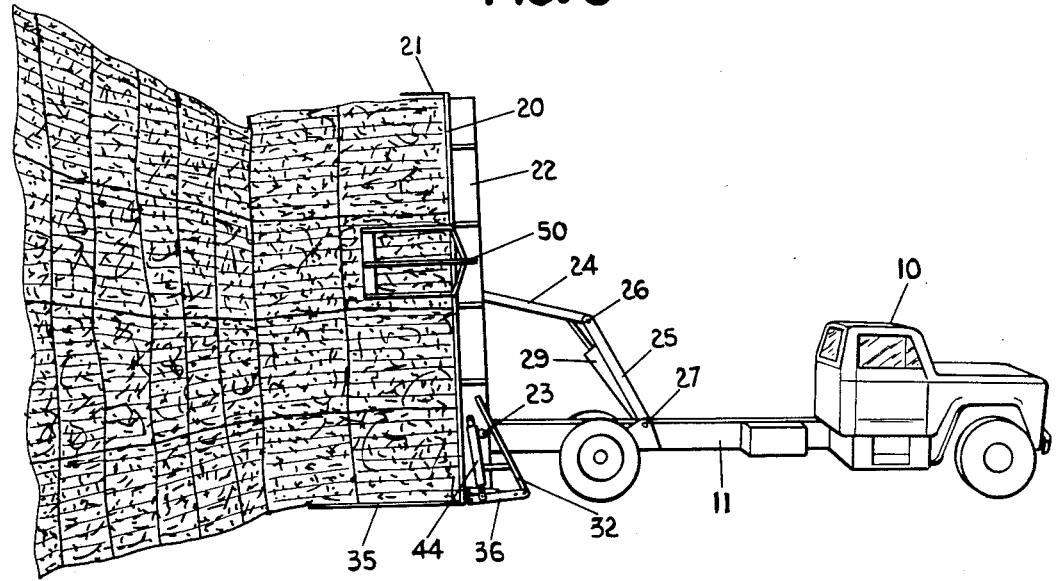
Figure 10:
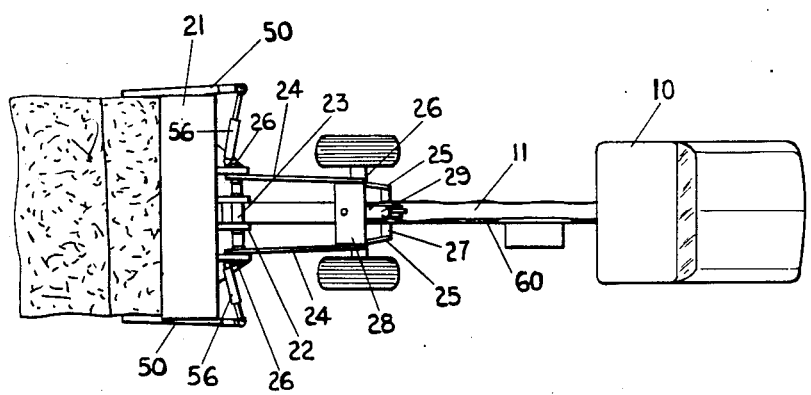
FIG. 10 is a plan view of the apparatus of the present invention during the unloading step of FIG. 7.

Platform 20 is pivotally mounted to truck frame 11 by means of pivot axle 23, through platform side walls 22 and truck frame 11, as best shown in FIG. 10. Pivot axle 23 should be located near the end of truck frame 11. The location of pivot axle 23 on platform 20 is at a distance forward of the rear end of platform 20 approximately equal to the height of platform 20 from the ground so that the rear end of platform 20 will be adjacent to the ground when in the vertical position such as shown in FIG. 7.

Figure 6:
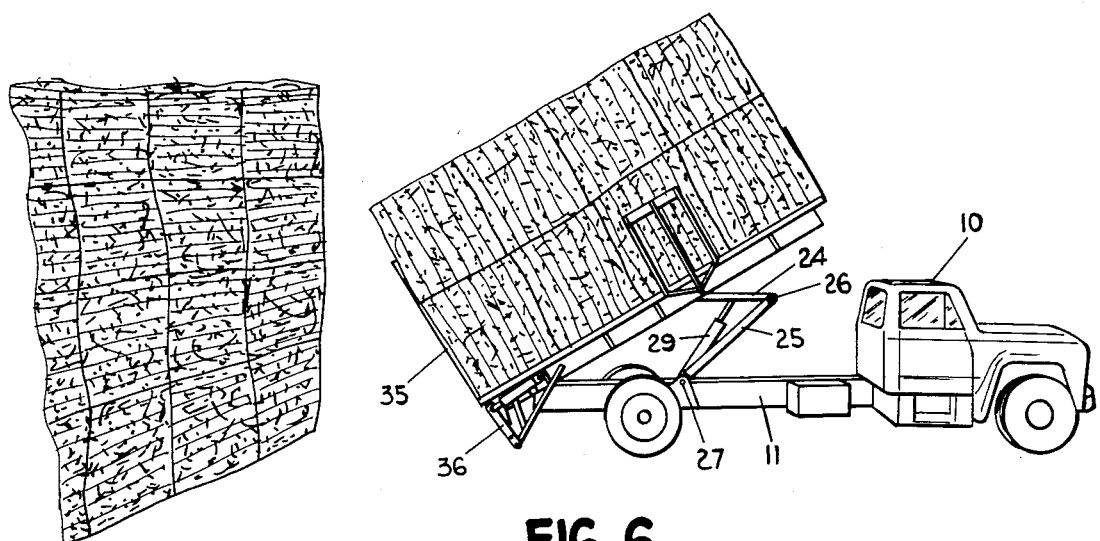
FIGS. 6 and 7 are side elevational views showing the use of the apparatus of the present invention to unload a stack of bales.

While a variety of conventional power means can be employed for pivoting platform 20 between a horizontal position (FIG. 1) and a vertical position (FIGS. 7 and 10), it is preferred to utilize a hydraulic cylinder as the power means. Accordingly, as best shown in FIGS. 6, 7, and 10, a hydraulic powered linkage system is employed for pivoting platform 20. The linkage system includes a pair of upper links 24 and a pair of lower links 25. Links 24 are pivotally connected to platform side walls 22 and to the upper ends of lower links 25 by pivot pins 26. Lower links 25 are pivotally connected to truck frame 11 by pivot axle 27. A rigid cross strut 28 connects upper links 24 for structural stability. The lower end of hydraulic cylinder 29 is pivotally attached to the top surface of frame 11, and the hydraulic piston rod is pivotally attached to cross strut 28.

Figure 8:
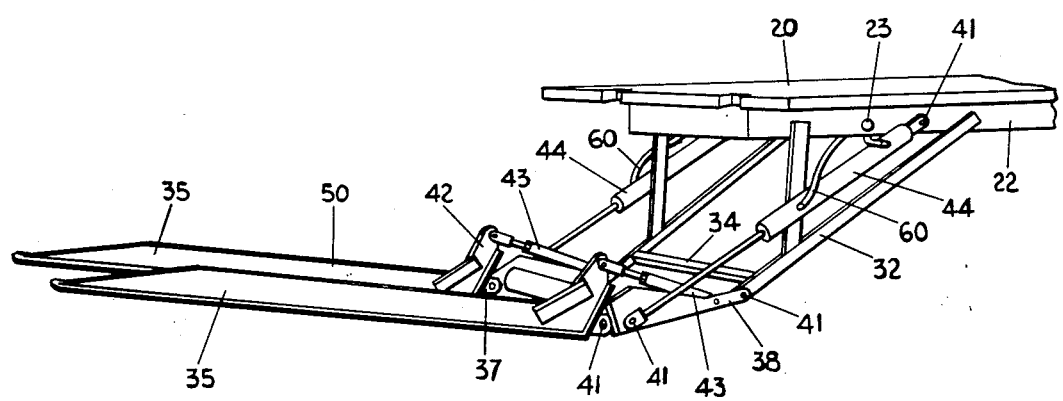
FIG. 8 is a rear perspective view of the loading ramp of the apparatus in a partially lowered position.
Figure 9:
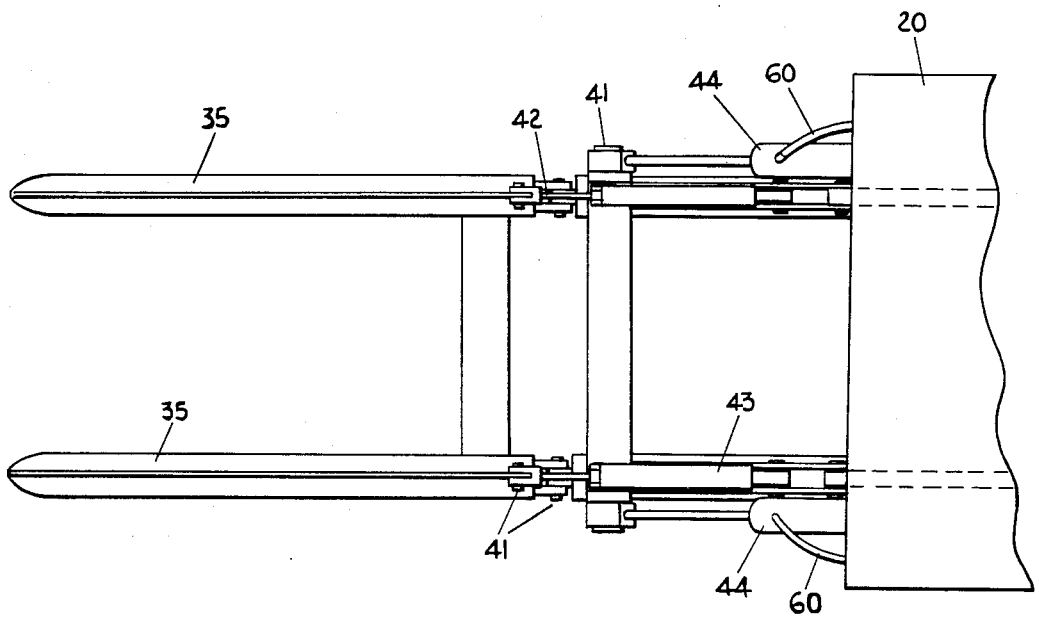
FIG. 9 is a plan view of the loading ramp apparatus of FIG. 8.

As best shown in FIGS. 1, 8, and 9, bale loading apparatus 30 is mounted at the rear of platform 20. The bale loading apparatus includes a rigid frame 31 which is mounted near the rear of platform 20 and which depends below it. In the illustrated embodiment, frame member 31 includes a pair of angled struts 32 and a pair of uprights 33. The upper ends of each of the angled struts and uprights are rigidly attached to side walls 22 of platform 20, and the lower ends of the uprights are rigidly attached near the lower ends of the angled struts. A rigid cross strut 34 rigidly joins the two angled struts 31 for structural stability.

A loading ramp is pivotally mounted to the ends of the angled struts 31. In the preferred embodiment, the loading ramp includes a pair of fork members 35 and a pair of connecting links 36. As shown in FIG. 1, the proximal ends of forks 35 are pivotally mounted to the distal ends of links 36, and the proximal ends of links 36 are pivotally mounted to the distal ends of angled struts 32. While a variety of pivoting connections can be employed, a simple and effective design is to provide U-shaped proximal ends 37 and 38 on the forks 35 and link members 36, respectively, which mate with corresponding tongue ends 39 and 40 of link members 36 and angled struts 31, respectively. Pivot pins 41 pass through corresponding holes in the U-shaped ends and tongue ends to provide the pivotable connection.

As best shown in FIG. 8, the proximal ends of forks 35 have upright portions 42 which function as bale stop members so that the bales are in the proper position on fork members 35 for loading onto platform 20. The purpose for preferring that forks 35 be pivotally mounted to links 36 is to permit minor adjustments to the plane of the fork members with respect to the plane of the linkage members. Accordingly, a pair of adjusting members 43 pivotally connect the upper ends of stop members 42 to linkage 36 near the pivot points between linkage members 36 and angled struts 32. Adjustment members 43 can be, for example, a turn buckle type of adjustment means. Since it is important in operation that forks 35 be level with the ground when in the lowered position, adjustment members 43 can be extended or retracted to thereby pivot forks 35 to insure parallelism with the ground. When this adjustment is made, adjustment members 43 can be locked and need only be readjusted if misalignment occurs during any use of the apparatus. Once adjustment members are locked, the forks 35 are rigidly connected to links 36. In addition, it is preferred that enlarged openings or slots be incorporated at the pivot point of members 43 in stop members 42 to provide some play in the individual forks 35. This provides for some minor automatic leveling of forks 35 when on the ground if the topography is irregular or bumpy.

Power means are utilized to pivot forks 35 from the generally vertical position shown in FIG. 1 to a position where the forks are at ground level and parallel therewith. In the preferred embodiment, a pair of hydraulic cylinders 44 are pivotally mounted between side walls 22 of platform 20 and the corresponding link members 36. Pivot pins 41 can also be used for pivotally mounting the hydraulic cylinders 44.

With the above design of bale loading apparatus 30, extension of hydraulic cylinders 44 will pivot forks 35 from the vertical position shown in FIG. 1 through an arc of approximately 90 degrees to a position with the forks at ground level and parallel therewith. Retraction of the hydraulic cylinders will return the forks to the position shown in FIG. 1. In addition, as will be discussed hereinafter, the forks can be stopped at various intermediate positions if desired.

In order to assist in stabilizing a full load of bales and to facilitate relocating stacks of bales, a pair of retriever arms 50 are provided on the sides of platform 20. While the size and configuration of retriever arms 50 can vary according to the sizes and types of bales to be loaded, a preferred design has been illustrated. Retriever arms 50 include three upright sections 51 rigidly joined at the top by cross members 52. Three U-shaped pivot brackets 53 are mounted on each side of platform 20 to receive the lower portions of uprights 51 for the pivotal attachment. The uprights are joined below brackets 53 by lower cross members 54, and a single, central tongue member 55 extends there below to pivotally engage the distal end of a power means, such as hydraulic cylinders 56, which are pivotally mounted to side walls 22 of platform 20. When hydraulic cylinders 56 are extended, retriever arms 50 will pivot inwardly to grip bales loaded on platform 20. (The position shown in FIG. 1.) When cylinders 56 are retracted, retriever arms 50 will pivot outwardly to the position shown in phantom in FIG. 1, which is a non-gripping position.

Hydraulic cylinders 29, 44, and 56 are powered and controlled by conventional means. For example, a conventional hydraulic pump can be mounted in front of truck 10 with a power take-off connection to the truck engine. Hydraulic hoses 60 are then utilized to connect the hydraulic cylinders with the hydraulic pump. A remote central control panel can then be located in the cab of truck 10 so that the entire apparatus can be operated with the driver of the truck remaining in the truck cab.

In use, truck 10 is driven to the site of the bales to be moved and stacked. Forks 35 are lowered to the ground level, horizontal position, and truck 10 is backed toward the particular bale until the bale is seated on forks 35. If for any reason it is desirable to have the bale in a different orientation prior to loading, the driver can lower the forks to an intermediate position, as shown in FIG. 8, and forks 35 will function as a pusher member as the truck is backed up to rotate or tip the bale to the desired orientation.

Figure 2:
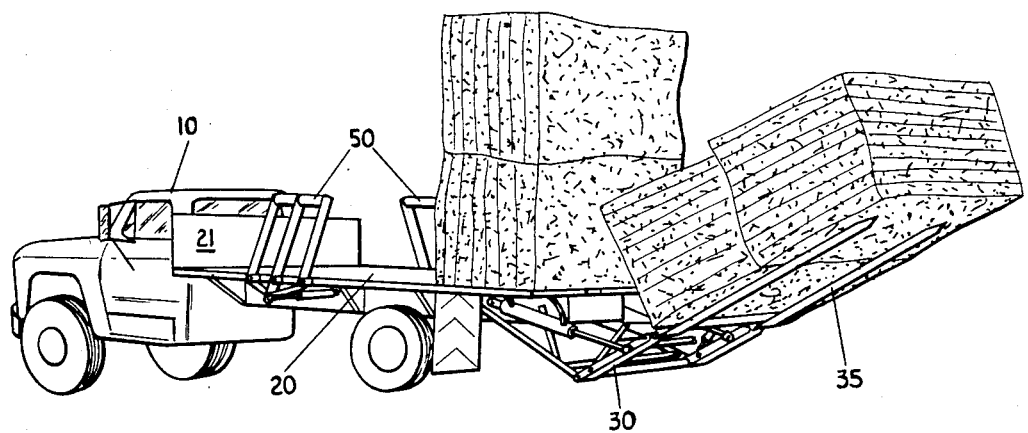
FIGS. 2-5 are rear perspective views showing various stages of loading the bale platform with the apparatus of the present invention.
Figure 3:
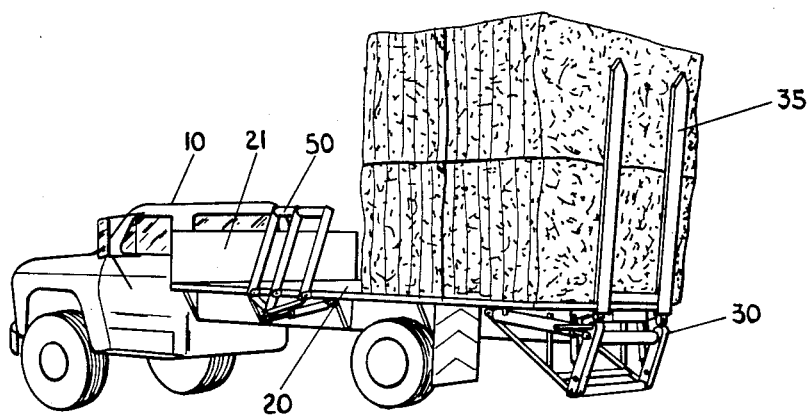
Figure 4:
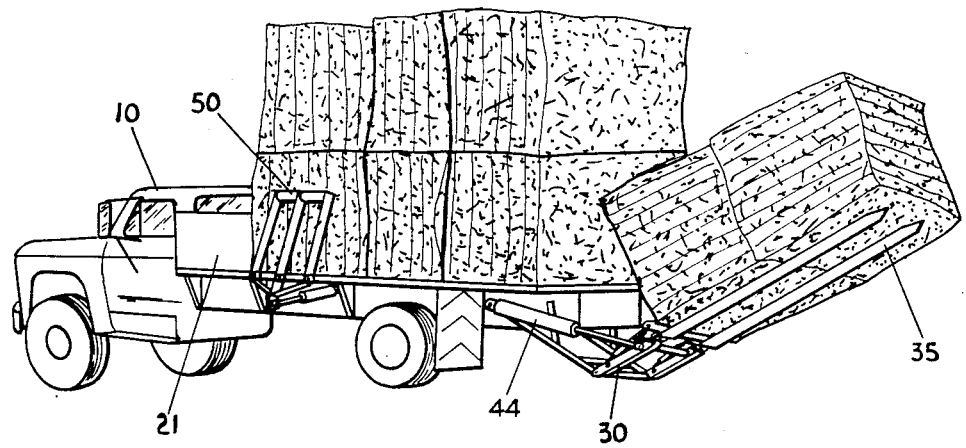
Figure 5:
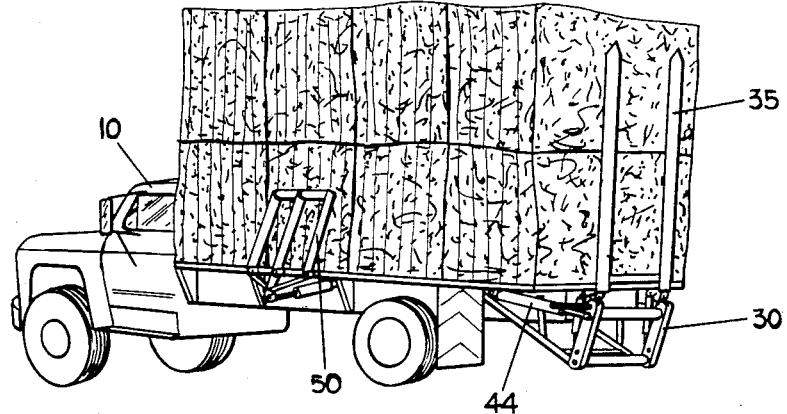

To load two bales during a single operation and to create a double bale tier on platform 20, the driver repeats the above procedure and backs into a second bale which will urge the first bale forward against stop means 42. Hydraulic cylinders 44 are then retracted and the two bales will be stacked at the rear of platform 20 in the position shown in FIG. 2. This procedure is then repeated. With two more bales loaded on the forks as shown in FIG. 2, as forks 35 are pivoted to the vertical position, the first two bales already on platform 20 will be urged forwardly until all four bales are on platform 20 in the position shown in FIG. 3. The same procedure is repeated until the truck is fully loaded as in FIG. 5, with FIG. 4 illustrating the loading of the last two bales. Hydraulic cylinders 56 are then extended so that retriever arms 50 grip the load for added stability of the load of bales. This entire loading procedure can be accomplished with a single operator remaining in the cab of truck 10.

The truck is then driven to a central accumulation or storage area. The truck is backed to the location desired to deposit the load, and hydraulic cylinder 29 is actuated to pivot platform 20 from the horizontal position to the vertical position for unloading. (FIGS. 6 and 7.) Hydraulic cylinders 56 are then retracted to release the grip of retriever arms 50, and truck 10 is then driven forwardly, leaving behind eight bales of hay neatly stacked. Platform 20 is then returned to the horizontal position, and the truck can then be returned to the field to pick up a new load. The unloading is thus also accomplished by a single operator without leaving the cab of truck 10.

If it is desired to relocate a stack of bales, platform 20 is returned to the vertical position shown in FIG. 7. Truck 10 is then backed toward the stack of bales until forks 35 are completely under the stacks to be relocated. Hydraulic cylinders 56 are then extended so that retriever arms 50 grip the bale stack. Hydraulic cylinder 29 is then retracted to return platform 20 to the horizontal position, with a complete load of bales for relocation. This operation is also accomplished by a single operator without leaving the cab of truck 10.

Thus, the apparatus of the present invention is simple in construction, and easy and efficient to operate. It permits a single operator to completely load a bale truck, deposit the entire load, and relocate the entire load without ever having to leave the cab of truck 10. Further, since truck 10 can have a variety of other uses throughout the season, the design of the apparatus of the present invention permits complete freedom of use of truck 10 for a variety of other desired purposes.

While a preferred embodiment of the present invention has been described and illustrated, it will be obvious to those skilled in the art that various changes and modifications can be made without departing from the spirit of the present invention. For example, while fork means have been described as the preferred loading ramp, a variety of other loading ramps such as a plate ramp can be utilized. While hydraulic cylinders are the preferred power means, other power means such as motor driven gear and pulley power means can be utilized. While the apparatus of the present inventiion has been shown mounted on the frame of a truck, it can be mounted on virtually any type of wagon or other mobile means. Accordingly, the scope of the present invention is deemed to be limited only by the following claims.

The embodiments of the invention in which an exclusive property or privilege is claimed are defined as follows:

1. Large bale loading-stacking apparatus for loading and stacking large bales of hay on a truck and then transferring the stacked bales as a unit from the truck to a storage area, all without having to manually handle the large bales, said apparatus comprising:

a large bale accumulator platform mounted on a bed of the truck, said accumulator platform including pivot mounting means for pivotally mounting said platform on the truck bed to permit said platform to be pivoted between a horizontal position and a vertical position, said pivot mounting means being at a location on the accumulator platform such that the rear end of the platform abuts the ground when the bed is pivoted to a vertical position;

power means for pivoting said platform between a horizontal position and a vertical position;

bale loading apparatus mounted at the rear of the platform, said bale loading apparatus including:

a rigid frame mounted on the underside of the platform and extending downwardly therefrom to a distal end positioned near the ground and below the rear end of the platform;

a loading ramp pivotably mounted on the distal end of the frame for vertical pivotal movement with respect to the frame, the loading ramp including a front portion that extends downwardly and outwardly from the distal end of the frame to ground level when the loading ramp is pivoted to a lowered position, the loading ramp including a rear portion that extends outwardly from the front portion at an angle such that the rear portion extends horizontally rearwardly from the front portion and lies flat against the ground when the loading ramp is lowered, the rear portion being shaped to slide under a large bale of hay when the loading ramp is lowered to the ground and the truck is backed up into a large bale of hay, the rigid frame resisting foward forces on the loading ramp and supporting the loading ramp as it is being forced under the large bales of hay;

at least one one fluid drive cylinder means for pivoting the loading ramp between its lowered position and a raised position, wherein the loading ramp extends generally vertically against the rear end of the accumulator platform to lift large bales of hay from the ground to the rear of the accumulator platform, said drive cylinder means having an extendable output shaft and being connected at one end to the accumulator platform or frame and connected at the other end to the pivotable loading ramp at a position rearwardly of the loading ramp pivot point, said drive cylinder pivoting the loading ramp upwardly from its lowered to its raised position by retracting the output shaft.

2. Apparatus according to claim 1 wherein the front and rear portions of the loading ramp are pivotally connected together and fastened at a generally fixed angular position with respect to each other by linkage interconnecting both portions, the linkage being adjustable to vary the angular positions of the portions.

3. Apparatus according to claim 2 wherein the pivot points between the front and rear portions include enlarged openings so as to provide some play in the angular position of the front and rear portions to provide additional ability of the rear portion to adjust to the level of the ground.

4. Apparatus according to claim 2 wherein the front portion of the loading ramp is a connecting linkage and the rear portion comprises a pair of spaced fork members, the angle of each fork member with respect to the connecting linkage being individually adjustable.

5. Apparatus according to claim 4 wherein the fork members have a T-shaped cross section with the leg of the T facing upwardly, the outer end of the leg being beveled downwardly and outwardly to permit the fork to be wedged under the large bale as the loading ramp is backed into contact with the bale, the loading ramp including stop means for limiting inward movement of the bale beyond a predetermined point on the loading ramp.

6. A bale loading-stacking apparatus according to claim 1 which further comprises at least two retriever arms pivotally mounted on opposite sides of said platform intermediate said front end and said rear end and extending above said platform, and power means to pivot said arms inwardly to grip bales on said platform and outwardly to a non-gripping position.

7. A large bale stacking and loading mechanism comprising:
 a flatbed truck having a non-articulated frame interconnecting front and rear sets of wheels on the truck, a bed mounting frame extending rearwardly from a truck cab to an end position rearward of the rear wheels;
 a large bale accumulator platform mounted on a bed of the truck, said accumulator platform including pivot mounting means for pivotally mounting said platform on the truck bed to permit said platform to be pivoted between a horizontal position and a vertical position, said pivot mounting means being at a location on the accumulator platform such that the rear end of the platform abuts the ground when the bed is pivoted to a vertical position;
 power means for pivoting said platform between a horizontal position and a vertical position;
 bale loading apparatus mounted at the rear of the platform, said bale loading apparatus including:
 a rigid frame mounted on the underside of the platform and extending downwardly therefrom to a distal end positioned near the ground and below the rear end of the platform;
 a loading ramp pivotably mounted on the distal end of the frame for vertical pivotal movement with respect to the frame, the loading ramp including a front portion that extends downwardly and outwardly from the distal end of the frame to ground level when the loading ramp is pivoted to a lowered position, the loading ramp including a rear portion that extends outwardly from the front portion at an angle such that the rear portion extends horizontally rearwardly from the front portion and lies flat against the ground when the loading ramp is lowered, the rear portion being shaped to slide under a large bale of hay when the loading ramp is lowered to the ground and the truck is backed up into a large bale of hay, the rigid frame resisting forward forces on the loading ramp and supporting the loading ramp as it is being forced under the large bales of hay;
 at least one one fluid drive cylinder means for pivoting the loading ramp between its lowered position and a raised position, wherein the loading ramp extends generally vertically against the rear end of the accumulator platform to lift large bales of hay from the ground to the rear of the accumulator platform, said drive cylinder means having an extendable output shaft and being connected at one end to the accumulator platform or frame and connected at the other end to the pivotable loading ramp at a position rearwardly of the loading ramp pivot point, said drive cylinder pivoting the loading ramp upwardly from its lowered to its raised position by retracting the output shaft.

8. A process for loading and stacking large hay bales employing a truck having a bed with an accumulator platform pivotably mounted on the bed and a loading ramp movable mounted on the rear end of the accumulator platform, the accumulator platform being movable between a generally horizontal and a generally vertical position, with the bed being mounted such that the rear end of the accumulator platform is closely adjacent the ground when the platform is pivoted vertically, the loading ramp being movable at least when the accumulator platform is in its horizontal position and having a raised position wherein the loading ramp extends upwardly from the rear end of the accumulator platform and having a lowered position wherein the loading ramp abuts the ground, the accumulator platform and loading ramp being power driven by a truck operator by controls in the truck cab, the method comprising backing the truck to a position wherein each bale is positioned sideways behind the truck, lowering the loading ramp until it rests flat against the ground, backing the truck up with the loading ramp riding on the ground until the loading ramp is wedged under the bale, the size and weight of the bale preventing the loading ramp from sliding the bale rearwardly, pivoting the loading ramp upwardly to a vertical position once the bale has been lodged securely on the loading ramp, said pivotal movement transferring the heavy bale upwardly to the outer end of the accumulator platform and forcing any bale already in that position to slide inwardly toward the front of the platform, repeating the bale loading steps with other big bales until the accumulator platform is full, transporting the bales on the truck to a bale stacking location, backing the truck to a position where the bales are to be stacked, pivoting the entire accumulator platform rearwardly until the accumulator platform is vertical and the loading platform lies on the ground, driving the vehicle away with the platform in this position, the inertia of the big bales causing them to stay in place and permitting the loading platform to be slipped out from under the bales, whereby individual large bales are picked up, transported and stacked by a single person driving a truck without any manual handling of the bales and without the truck operator leaving the truck.

* * * * *